United States Patent [19]

Sceresini

[11] Patent Number: 5,427,606
[45] Date of Patent: Jun. 27, 1995

[54] BASE METALS RECOVERY BY ADSORPTION OF CYANO COMPLEXES ON ACTIVATED CARBON

[75] Inventor: Bruno J. Sceresini, Perth, Australia

[73] Assignees: Bruno Sceresini Holding Pty. Ltd.; Reynolds Australia Metals, Ltd., both of Western Australia; Fersayth N.L.; Forsayth (Gibson) Ltd., both of New South Wales, all of Australia

[21] Appl. No.: 50,345

[22] PCT Filed: Nov. 15, 1991

[86] PCT No.: PCT/AU91/00522

§ 371 Date: Jul. 8, 1993

§ 102(e) Date: Jul. 8, 1993

[87] PCT Pub. No.: WO92/08812

PCT Pub. Date: May 29, 1992

[30] Foreign Application Priority Data

Nov. 15, 1990 [AU] Australia ............... PK 3369

[51] Int. Cl.$^6$ .................................. C22B 11/08
[52] U.S. Cl. .......................... 75/743; 423/29; 423/658.5
[58] Field of Search ............ 423/29, 30, 31, 658.5; 266/101, 168, 170; 75/743

[56] References Cited

U.S. PATENT DOCUMENTS

| | | |
|---|---|---|
| 4,051,220 | 9/1977 | Coltrinari ............... 423/24 |
| 4,431,614 | 2/1984 | Makipirtti et al. ......... 423/29 |
| 4,528,166 | 7/1985 | McDougall ............... 423/23 |
| 4,555,385 | 11/1985 | Store ..................... 423/29 |
| 4,587,110 | 5/1986 | Potter .................... 423/30 |
| 4,595,572 | 6/1986 | Ogasa et al. ............. 423/29 |
| 4,606,766 | 8/1986 | Genik-Sas-Berezowsky et al. ........................ 423/30 |

FOREIGN PATENT DOCUMENTS 4385189 5/1990 Australia.

OTHER PUBLICATIONS

Muir et al "Processing Copper Gold Ores with Ammonia or Ammonia Cyanide Solutions", *Proceedings World Gold 1991*, Cairns Australia.

Mugoro and Furusa "Improving the Recovery of Gold and Copper in a CIP Operation" Zimbabwae 1990.

Laxer "Carbon in Pulp in South Africa" South Africa Oct. 1982.

Fleming and Nicol, "The Absorption of Gold Cyanide onto Activated Carbon III" pp. 85–93 (South Africa, Apr. 1984).

Ugarte, "Advances Recientes En La Metalurgia Extractiva Del Oro Y La Plata" (1988).

Muir et al., "Recovery of Gold from Copper-Bearing Ores" pp. 363–374 (USA, Nov. 1989).

Sceresini and Staunton, "Copper/Cyanide in the Treatment of High Copper Gold Ores" pp. 123–125 (Australia, oct. 1991).

Sceresini and Richardson, "Development and Application of a Process to Recover Copper and Cyanide From Cyanidation Slurries" (Australia, Mar. 1991).

Lorosch et al., "Optimization of Heap Leach Process Chemistry" (Germany, 1992).

*Primary Examiner*—Melvyn J. Andrews
*Attorney, Agent, or Firm*—Robbins, Berliner & Carson

[57] ABSTRACT

A recovery method for base metal values (e.g. copper) from ore slurry or aqueous solution, comprising forming a solution of a metal complex (e.g. cyano-copper) having an affinity for adsorption sites on activated carbon, adsorbing the metal complex onto activated carbon, and stripping the adsorbed metal complex by forming a reaction product with said metal complex, the reaction product having no affinity for adsorption sites on activated carbon. A method for recovering base metals and noble metals separately from an ore containing both is also disclosed. The method is carried out in an apparatus comprising a leaching stage (17) and an adsorption stage (221) which may be combined, and an elution column (11). The method and apparatus also provide a mechanism for recovery of activated carbon and cyanide.

18 Claims, 4 Drawing Sheets

BASE METALS RECOVERY BY ADSORPTION OF CYANO COMPLEXES ON ACTIVATED CARBON

This invention relates to a system and method for recovering metal(s) from pulp material which has particular, although not exclusive utility, in the extraction and recovery of noble metals from ores containing the same.

In this specification, noble metals are defined to include gold, and base metals are defined to include metals other than gold which are comparatively aesthetically less valuable, such metals including nickel and copper. In particular, the invention has application in the extraction process of gold from aurous material, commonly known as the carbon-in-pulp or carbon-in-leach process.

The carbon-in-pulp and the carbon-in-leach process for the recovery of gold and silver from cyanide leaching of ores is widespread in the noble metals mining industry. However, existing plants are considerably expensive to construct and run, and accordingly any improvement in the efficiency and construction of the plant, and in the method of running the same, can lead to major savings in costs.

The carbon-in-pulp (CIP) process or the carbon-in-leach (CIL) process generally consists of the steps of feed preparation of the ore to form a pulp, leaching with cyanide solution, adsorption of the resulting cyano-gold complex onto activated carbon, stripping the cyano-gold complex from the carbon using elution and recovering the gold from the eluate by electrowinning or other suitable process.

The CIP process is characterised by the adsorption stage occurring separately from the leach stage and the CIL process is generally characterised by combining the leaching and adsorption steps or stages so that these are performed concurrently; both processes having the stripping and recovering steps performed as a subsequent step.

It is an object of certain aspects of the present invention to provide a system and method which improves the efficiency of a CIP and/or CIL process by effectively operating or performing the metal stripping step or stage concurrently with the adsorption step or stage, either as an adjunct to all of the steps of a conventional CIP or CIL plant, or as an alternative to such plants.

The presence of various base metals in the ore can also have a detrimental effect of great proportions on the efficiency and economics of a CIP or CIL process due to the high consumption of cyanide, and a reduction in the leaching and adsorption rates and also in the recovery rate of the noble metals. Furthermore, the presence of a fast leaching and adsorbing base metal such as copper can significantly reduce the carbon loading capacity for the noble metals, thereby necessitating more frequent stripping and a higher carbon inventory resulting in higher production costs.

Hitherto, known processes for dealing with base metals contained in noble metal bearing ores have concentrated on minimising the formation of copper cyanide complexes during the leach process by such methods as operating the chemical environment to minimise the formation of base metal cyanide complexes, or pretreating the ore to render the base metals relatively inert to cyanide ions so that cyano-base metal complexes do not form; or have got around the problem by ignoring it, merely expending larger quantities of cyanide or carbon in order to recover the required noble metals.

Accordingly, it is an object of certain other aspects of the present invention to provide a system and method to mitigate the aforementioned detrimental effects of base metal laden feed and also, in certain instances, to provide for the recovery of the base metals in a saleable form.

In accordance with a first aspect of the present invention there is provided a method of recovering base metal values from material containing said base metal values and noble metal values, comprising:

forming an aqueous solution of a cyano-base metal complex and a cyano-noble metal complex including a cyano-base metal complex anion anion having the stoichiometry $M(CN)_x{}^{y-}$, where M is a base metal cation, x is 2 or 3 or 4, and y is 1 or 2 or 3; by adjusting the amount of available cyanide anion to said base metal cation to favour formation of said cyano-base metal complex anion;

adsorbing said cyano-base metal complex onto activated carbon by contacting said aqueous solution with said activated carbon until a significant amount of said cyano-base metal complex has been adsorbed; and stripping said cyano-base metal complex from said activated carbon as cyano-base metal complex for subsequent recovery of the base metal values and recovery for re-use of barren activated carbon or partially stripped activated carbon containing nobel metal values.

Where the base metal is copper, $x=2$ and $y=1$. Where the base metal is nickel, $x=4$ and $y=2$.

Preferably in the step of forming said solution, said available cyanide is adjusted by adding aqueous cyanide in quantity sufficient to satisfy but not substantially exceed the ratio of x moles of cyanide anions to one mole of available base metal cation, where x is 2 or 3 or 4.

Preferably the step of forming said cyano-base metal complex is carried out in a chemical environment where the pH is less than or equal to 9.

Preferably the pH is maintained at approximately 8.

Preferably the steps of forming said cyano-base metal complex and adsorbing said cyano-base metal complex are performed concurrently.

Preferably the step of stripping said cyano-base metal complex is performed by contacting said activated carbon supporting said cyano-base metal complex, with a further solution of aqueous cyanide at a concentration sufficient to increase the cyanide mole ratio of said cyano-base metal complex.

Preferably in the step of stripping said cyano-base metal complex, said further solution of aqueous cyanide is added in quantity sufficient to satisfy or exceed the ratio of one mole of cyanide anion to one mole of complex anion available on said activated carbon supporting said cyano-base metal complex.

In accordance a second aspect of the present invention there is provided a method of recovering base metal values and noble metal values from an ore containing said two values comprising the steps of:

operating the method as described in said first aspect at parameters favourable to leaching said base metal values from said ore, and substantially unfavourable for leaching said noble metal values from said ore; and recovering said noble metals values from said ore subsequent to having removed said base metal values therefrom.

Preferably the step of stripping said base metal complex is performed at a temperature of less than 45° C.

Preferably the step of stripping said base metal complex is performed at a temperature of less than 40° C.

In accordance with a third aspect of the present invention there is provided in a carbon-in-pulp or carbon-in leach process for extracting noble metal values from ores rich in the same, a further process for recovering base metal impurities contained in said ore comprising removing said base metal impurities by operating the method as described in any said first aspect to treat said ore, before extracting said noble metal values from said ore.

Preferably the step of stripping said base metal complex is performed at a temperature of less than 45° C.

Preferably step of stripping said base metal complex is performed at a temperature of less than 40° C.

In accordance with a fourth aspect of the present invention there is provided in a carbon-in-pulp or carbon-in-leach noble metal recovery plant, apparatus to recover base metal values from pulp material containing same, comprising: input means for receiving loaded carbon from an adsorption stage within said leach noble metal recovery plant, said input means being located upstream from any noble metal values stripping stage in said noble metal recovery plant; elution means to:
receive loaded carbon from said input means,
elute said loaded carbon with an appropriate eluant, and
produce an elute comprising cyano-base metal values for subsequent recovery, and produce stripped or partly stripped carbon for recycling back into said noble metal recovery plant.

Preferably said apparatus further includes a recovery stage to recover substantially all of said eluant from said eluate for reuse.

In accordance with a fifth aspect of the present invention there is provided a method of recovering base metal values from material containing said base metal values and nobel metal values comprising:
forming an aqueous solution of a cyano-base metal complex having an affinity for adsorption sites on activated carbon, by adjusting the amount of available cyanide anion to said base metal cation in order to form said complex;
adsorbing said cyano-base metal complex onto activated carbon by contacting said aqueous solution with said activated carbon until a significant amount of said cyano-base metal complex has been adsorbed;
stripping said cyano-base metal complex from said activated carbon for subsequent recovery, by altering the chemical environment in order to form a cyanide complex reaction product from said cyano-base metal complex and said chemical environment, where said reaction product is characterised in having less affinity for adsorption sites on activated carbon;
and returning for re-use barren activated carbon or partially stripped activated carbon containing noble metal values.

Preferably said cyano-base metal complex comprises a complex anion having the stoichiometry $M(CN)_2^-$, where M is a base metal cation, and said cyano-base metal complex is formed by adjusting the amount of available cyanide anion to said base metal cation.

In accordance with another aspect of the present invention there is provided in a system for recovering metal(s) from pulp material containing same having a cyanide leaching stage, carbon adsorption stage and a metal stripping stage, there being provided a preliminary stripping stage for removing metal values from adsorbed metal cyanide complexes at the commencement of said adsorption stage comprising elution means to: (i) receive loaded carbon from said adsorption stage, (ii) elute said loaded carbon with an appropriate eluant, and (iii) produce an eluate containing values of said metal(s) for subsequent recovery of said metal(s), and stripped or partly stripped carbon for recycling back into said carbon adsorption stage for further adsorption.

In a preferred form, said preliminary stripping stage is operated to provide an optimum chemical environment for the desorption and stripping kinetics of certain base metals present in said pulp to remove said base metals from said adsorption stage at the commencement thereof so that adsorption can proceed thereafter with substantially base metal impoverished pulp.

In an alternative preferred form, said preliminary stripping stage is operated to provide a favourable chemical environment for the adsorption and stripping kinetics of certain noble metals present in said pulp to remove at least some of said noble metals from said adsorption stage at the commencement thereof and thus enable recovery of some of said noble metals at an early stage in said system.

Preferably, in either preferred form, said preliminary stripping stage is operated continuously and concurrently with said adsorption stage.

Preferably, in said alternative preferred form said preliminary stripping stage is operated to provide a suitable chemical environment for the adsorption and stripping kinetics of both noble and base metals present in said pulp to remove substantially all of said base metals and at least some of said noble metals from said adsorption stage, at the commencement of, and concurrent with the proceeding of said adsorption stage, for subsequent recovery of both said noble and base metals at an early stage in said system.

Preferably, in said alternative preferred form, said preliminary stripping stage includes a metal extraction circuit comprising a base metal extraction means and a noble metal extraction means, said noble metal extraction means comprising secondary adsorption means for adsorbing noble metal values from said eluate onto carbon after extraction of said base metals from said eluate, so that further adsorption is performed in an optimum environment for achieving high noble metal loadings for subsequent recovery thereof.

Preferably, said noble metals include gold and said base metals include copper.

Preferably, said base metal extraction means uses precipitation and filtering techniques or alternatively, or additionally, metal selective resins or Vitrokele in an ion exchange apparatus to extract base metals from said eluate.

Preferably, said elution means comprises an elution column having an upper open end for receiving said loaded carbon from said adsorption stage and a lower adjustable outlet for selectively removing stripped or partly stripped carbon from said column, an inlet port for introducing eluant under pressure towards the lower end of said column, and an outlet port for removing eluate towards the upper end of said column so that elution takes place along the column.

Preferably, said eluant is a cyanide solution.

Preferably, said chemical environment for the adsorption and stripping kinetics of said metals is controlled for said base metals by maintaining a relatively cold elution temperature and for said noble metals by maintaining a comparatively high elution temperature.

In accordance with yet another aspect of the present invention, there is provided a system for recovering metal(s) from pulp material containing same comprising:
- a cyanide leaching stage;
- a carbon adsorption stage; and
- a metal stripping stage including elution means for receiving carbon loaded with said metal(s) at the commencement of said adsorption stage, eluting said loaded carbon with an appropriate eluant and providing eluate containing said metal(s) for subsequent recovery and stripped or partially stripped carbon for recycling back into said carbon adsorption stage.

In a preferred form, said elution means is initially operated to provide an optimum chemical environment for the adsorption kinetics of said base metals so that base metals are removed from said system, and is subsequently operated to provide an optimum chemical environment for the adsorption and stripping kinetics of noble metals substantially free from competing base metals so that noble metals can be removed from said system.

In an alternative preferred form, said elution means is operated to provide a suitable chemical environment for the adsorption and stripping kinetics of both noble and base metals present in said pulp to remove noble and base metals from said adsorption stage, at the commencement of, and concurrent with, the proceeding of said adsorption stage, for subsequent recovery of both said noble and base metals at an early stage in said system.

Preferably, said metal stripping stage is operated continuously and concurrently with said adsorption stage.

Preferably, said noble metals include gold, and said base metals include copper.

Preferably, said elution means comprises an elution column having an upper open end for receiving said loaded carbon from said adsorption stage and a lower adjustable outlet for selectively removing stripped or partly stripped carbon from said column, an inlet port for introducing eluant under pressure towards the lower end of said column, and an outlet port for removing eluate towards the upper end of said column so that elution takes place along the column.

Preferably, said eluant is a cyanide solution.

Preferably, said chemical environment for the adsorption and stripping kinetics of said metals is controlled for said base metals by maintaining a relatively cold elution temperature and for said noble metals by maintaining a comparatively high elution temperature.

In accordance with a further aspect of the present invention, there is provided in a method for recovering metal(s) from pulp comprising the steps of leaching said pulp with cyanide to produce metal cyanide complexes, adsorbing said metal cyanide complexes onto carbon, and stripping loaded metal values from said carbon after adsorption of said metal cyanide complexes to recover said metal(s); a further step comprising performing preliminary stripping of metal values from said carbon at the commencement of the adsorption step, additional to said stripping at the completion of said adsorption.

Preferably, said preliminary stripping comprises receiving and eluting loaded carbon at the commencement of said adsorption step with an appropriate eluant and producing an eluate containing metal values for subsequent recovery of said metal(s) and stripped or partly stripped carbon for recycling back for further adsorption.

In a preferred form, said preliminary stripping is performed providing an optimum chemical environment for the adsorption and stripping kinetics of certain base metals present in said pulp to remove said base metals during the commencement of said adsorption step so that adsorption can proceed thereafter with substantially base metal impoverished pulp.

In an alternative preferred form, said preliminary stripping is performed providing a favourable chemical environment for the adsorption and stripping kinetics of certain noble metals present in said pulp to remove at least some of said noble metals during the commencement of said adsorption step so that at least some of said noble metals can be recovered at an early stage in the method.

Preferably, in either preferred form, said preliminary stripping is performed continuously and concurrently with said adsorption step.

Preferably, in said alternative preferred form said eluate is passed through a secondary carbon adsorption step for adsorbing noble metal values from said eluate onto carbon for subsequent recovery of said noble metal.

Preferably, in said alternative preferred form, said preliminary stripping is performed providing a suitable chemical environment for the adsorption and stripping kinetics of both noble and base metals present in said pulp to remove substantially all of said base metals and at least some of said noble metals, during the commencement of, and concurrent with, the adsorption step for subsequent recovery of both said noble and base metals at an early stage in said method.

Preferably, in said alternative preferred form, said preliminary stripping includes the step of further adsorbing noble metal values from said eluate onto carbon after extracting said base metals from said eluate for recovery, whereby said further adsorption is performed in an optimum environment for achieving high noble metal loadings for subsequent recovery thereof.

Preferably, said noble metals include gold and said base metals include copper.

Preferably, said chemical environment for the adsorption and stripping kinetics of said metals is controlled, for said base metals by maintaining a relatively cold elution temperature, and for said noble metals by maintaining a comparatively high elution temperature.

In accordance with yet a further aspect of the present invention, there is provided a method for recovering metal(s) present in pulp material comprising:
- leaching said pulp with cyanide to produce metal cyanide complexes;
- adsorbing said metal cyanide complexes onto carbon; and
- stripping loaded metal values from said carbon at the commencement of the adsorption step so that said stripping is performed concurrently with the proceeding of said adsorbing.

Preferably, said stripping includes: receiving and eluting carbon loaded with said metal(s) at the commencement of said adsorption step with an appropriate eluant and producing an eluate containing metal values for subsequent recovery of said metal(s) and stripped or partly stripped carbon for recycling back for further adsorption.

In a preferred form, said stripping step comprises:
(i) initially eluting said loaded carbon with an appropriate eluant in an optimum chemical environment for the adsorption and stripping kinetics of said base metals so that base metal values are removed from said system in preference to noble metal values in the resultant eluate, and
(ii) subsequently eluting loaded carbon with an appropriate eluant in an optimum chemical environment for the adsorption and stripping kinetics of said noble metals substantially free from competing base metals so that noble metal values are removed from said system for subsequent recovery.

In an alternative preferred form, said stripping step comprises eluting said loaded carbon with an appropriate eluant in a suitable chemical environment for the adsorption and stripping kinetics of both noble and base metals present in said pulp to remove noble and base metals at the commencement of the adsorption step and concurrent with the proceeding of said adsorption for subsequent recovery of both said noble and base metals at an early stage in said method.

Preferably, said metal stripping is performed continuously and concurrently with said adsorbing.

Preferably, said noble metals include gold, and said base metals include copper.

Preferably, said chemical environment for the adsorption and stripping kinetics of said metals is controlled for said base metals by maintaining a relatively cold elution temperature, and is controlled for said noble metals by maintaining a comparatively high elution temperature.

The invention will be better understood in the light of the following description of several embodiments thereof. The description is made with reference to the accompanying drawings, wherein.

Figure 1:
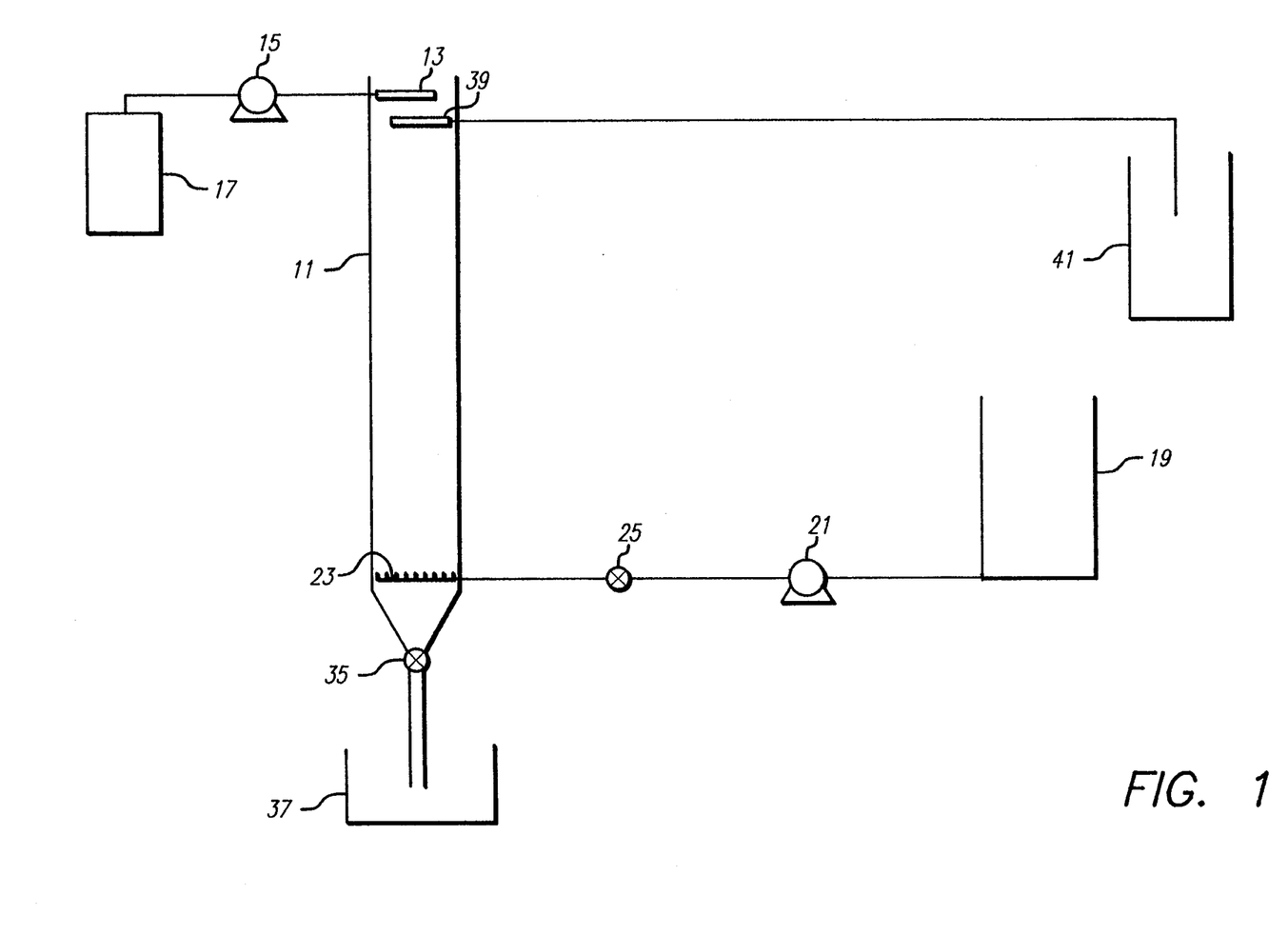
FIG. 1 is a schematic block diagram of an intermediate plant for removing base metal cyanide complexes from activated carbon in the ore leach/absorption stage in a CIP/CIL plant, according to the first embodiment.

In the first embodiment, a plant for removing base metal impurities in the form of copper ore, from ore stock feed containing noble metal values in the form of gold ore is described. Referring to FIG. 1, an elution column 11 is fed loaded carbon over a slurry separation screen 13, located at the top of the elution column 11. At the slurry separation screen 13 carbon is separated from the slurry, the slurry being returned to the absorption tank (route not shown). The loaded carbon is pumped to the slurry separation screen 13 by a pump 15, from a leach adsorption circuit stage 17. The elution column 11 is fed with made up sodium cyanide solution 19 via a pump 21 into the bottom thereof through a diffusing manifold 23. A one-way valve 25 is provided to prevent back-flow from the elution column 11 into the made-up sodium cyanide solution 19.

A valve 35 is provided for emptying the elution column 11 of stripped (or partly stripped) carbon. A receptacle 37 is shown for collecting the carbon, although in practice this method of dealing with stripped or partially stripped carbon would not necessarily be adopted. A variable speed pump or other method of transport ideally would be provided for removal of the carbon to the respective part of the plant. The preferred part of the plant to which this stripped carbon would be transported will be determined by the values with which it is loaded, after having had the copper values stripped therefrom.

An eluate outlet 39 is provided to transport the pregnant liquor eluted from the elution column 11 to a base metal recovery plant 41 for further processing.

The plant described with reference to FIG. 1 is ideally suited for use as an intermediate plant in an existing CIP/CIL gold recovery plant. In practice, the plant of this embodiment could be associated with each leach adsorption circuit stage in the ore processing plant. The purpose of the intermediate plant is to remove competing base metal cyanide complex salts from the carbon in the adsorption stage, in parallel with the adsorption of ore leaches.

The particular application for which this intermediate plant is envisaged is where gold bearing ores occur which contain copper ore. Where copper ores occur with gold bearing ores, copper has long been the bane of the mining industry engaged in recovering the gold from the gold ore. Copper competes with the gold for adsorption sites on carbon. In addition, the adsorbed copper cyanide complex salts have been found to contribute to the catalysed oxidation of cyanide, thus resulting in losses of cyanide reagent. Furthermore, without the use of the intermediate plant, the presence of copper cyanide complexes in the leach necessitates the use of more cyanide to maintain satisfactory gold leaching rates. The purpose of operating the intermediate plant as described in parallel with the leach and adsorption circuit is to remove the adsorbed copper cyanide complex salts from the carbon as soon as possible, thus minimising the contact time in the leach and adsorption circuit of the copper cyanide complex salts. The recovery of copper itself can be performed as an additional process, to economic advantage, in addition to the advantage obtained by minimising cyanide and carbon losses. Furthermore, it is believed that with the copper removed from the ore, the processing of the remaining gold bearing ore is able to proceed more quickly.

In the leach stage, the copper readily complexes with cyanide anions to form complex anions $Cu(CN)_2^-$, $Cu(CN)_3^{2-}$, and $Cu(CN)_4^{3-}$. The monovalent ion exists in a low pH environment, up to a pH of 9, or when the concentration of free cyanide ($CN^-$ or dissolved HCN) is low, where it may exist at slightly higher pH values. The relationship between the occurrence of the monovalent anion appears to be interdependent on both pH and free cyanide concentration. The species of complex anion freely inter-convert by varying the pH or altering the concentration of free cyanide available. The trivalent complex anion is most common at high pH or high concentrations of available cyanide.

The monovalent complex anion is readily adsorbed onto activated carbon, and is readily desorbed from activated carbon by altering the conditions of pH and/or available cyanide, making elution the ideal route for recovering the complex ionic values and recovering the activated carbon for reuse in the plant, as the divalent and trivalent complex anions only weakly adsorb onto activated carbon.

The monovalent cyano-copper complex species have been found to compete so strongly for adsorption sites on activated carbon, that adsorbed gold can be displaced from adsorption sites thereby. However, in practice, some gold values will adsorb onto the activated carbon, and pass through the elution column with the adsorbed cyano-copper complexes.

The elution column operates at a low temperature, and has found to effectively operate at a temperature up to 45° C., however any ambient temperature up to 40° C. is preferred, to minimise the chance of any loaded gold being desorbed from the activated carbon, with the desorbed cyano copper complex species. At this temperature, during the elution, the gold remains on the activated carbon, whilst the copper cyanide complex is desorbed from the carbon and transported as eluate, away from the elution column 11. The copper cyanide complex eluate can then be subjected to a suitable process for recovering the copper from the copper cyanide complex. A suitable process for doing this includes sulphidation by addition of suitable reagents such as sodium or ammonium sulphide, sodium or ammonium bisulphide, or hydrogen sulphide gas, together with a mineral acid for pH adjustment. The copper sulphide precipitate can then be filtered from the effluent liquor, and then an alkali such as sodium hydroxide injected into the filtrate to recover the sodium cyanide for reuse in the intermediate plant.

Figure 2:
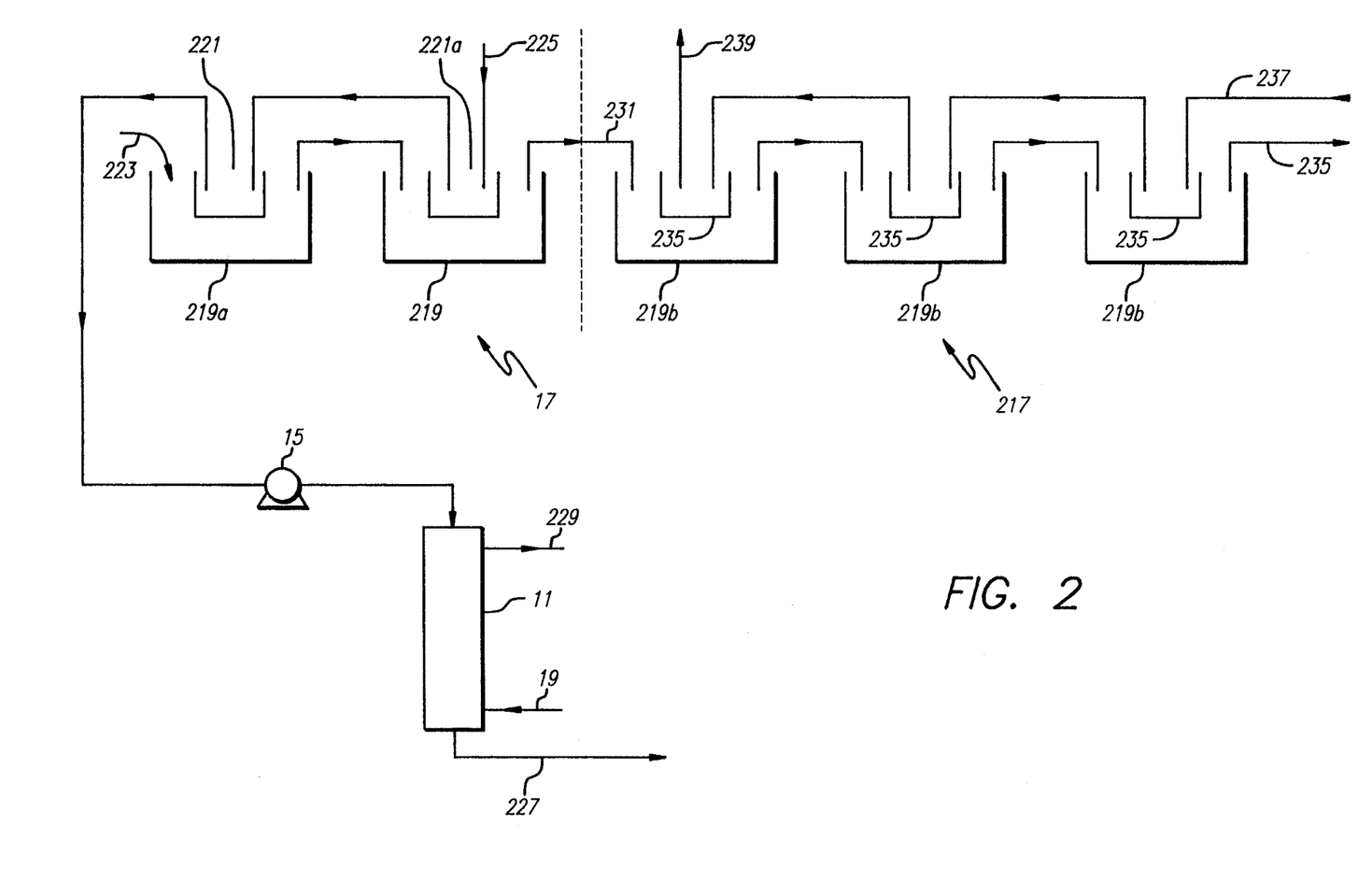
FIG. 2 is a schematic block diagram of the leach and adsorption stage of a CIL plant for noble metal recovery incorporating an intermediate plant for removing base metal cyanide complexes from activated carbon in the ore leach/absorption stage showing connection points to the intermediate plant shown in FIG. 1.

Referring to FIG. 2, the preferred manner of putting the invention into use, as an adjunct plant for removing copper values from gold bearing ores in a carbon-in-leach process, comprises the elution column 11 which is fed loaded carbon in the same manner as shown in FIG. 1, with reference to the description above, by a pump 15. The leach adsorption circuit stage 17 forms the leach and adsorption stages of the adjunct plant, and is a carbon-in-leach process, itself. The leach adsorption circuit stage 17 is essentially similar to the carbon-in-leach adsorption circuit stage 217 which is employed for the CIL gold extraction plant (not shown).

The leach adsorption circuit stage 17 of the intermediate plant comprises, in this embodiment, two separate stages 219, each of which has a adsorption vessel 221 containing activated carbon. In other embodiments, however the leach adsorption circuit stage comprises more than two separate stages. The stage 219 has an ore slurry feed 223, through which unprocessed ore is fed to the system. The ore is cascaded through subsequent stages of the leach adsorption circuit stage 17, and on into the gold CIL plant 217, through its stages 219b. Each stage contains a solution of sodium cyanide, the stages 219 of the leach adsorption circuit stage 17 being maintained at a pH of less than 9 and preferably 8, and with an available cyanide concentration sufficient to form the monovalent cyano-copper complex anion, to consume all of the copper in all stages 219 of the leach adsorption circuit stage.

Barren activated carbon is fed through the inlet carbon feed 225, into the adsorption vessel 221a, where an initial amount of monovalent cyano-copper anions are absorbed, after which it is transferred to the adsorption vessel 221 contained in the stage 219a, before being transferred to the elution column 11 of the intermediate plant. It has been found, that in practice, gold will load on to the activated carbon, in the intermediate stage, which will remain on the activated carbon providing that the elution temperature is kept below 45° C. The upper outlet 229 of the elution column will transport cyano-copper complexes for further processing to recover both of the copper, and the cyanide for reuse in the CIL plant.

Essentially the gold CIL plant 217 operates as a separate plant to the intermediate plant. However, the carbon which is still loaded with gold, which leaves the elution column lower outlet 227 may be fed into an appropriate stage 219b of the gold CIL plant 217, for loading further gold values thereon. The particular stage 219b to which this gold loaded carbon is fed should be determined by analysing the amount of gold present on carbon in adsorption vessels in the gold CIL stage, and feeding it into the adsorption vessel which has gold loadings which are similar to that obtained from the elution column lower outlet.

The intermediate plant ore output 231 is fed into the first stage 219 of the gold CIL plant 217. The ore contained in the intermediate plant ore output 231 is impoverished of copper, thus allowing the gold CIL plant 217 to operate at maximum efficiency, with minimum loss of cyanide and activated carbon. The barren ore finally leaves the gold CIL plant 217 through the barren ore output 233, where it is subsequently dumped in the tailing impoundment.

The stages 219b of the gold CIL plant 217 have adsorption vessels 235 which function in the same manner as those adsorption vessels 221 in the intermediate plant. Barren carbon or partially loaded carbon from the elution column lower outlet 227 is fed into the carbon inlet 237, or fed into an adsorption vessel upstream in the ore flow, as discussed above, in which case barren activated carbon would be fed into the carbon inlet 225; whereupon it progresses through the adsorption vessels 235 of the gold CIL plant, until it leaves the loaded carbon outlet 239 for further processing. The further processing would comprise stripping the loaded carbon of gold values. The flow of carbon through both plants is in a counter flow configuration to the flow of ore.

In practice, the whole process operates as a continuous process, rather than a batch process. The average residence time for reactants in each stage 219 is variable but is typically one to four hours. The concentration of activated carbon used in one trial intermediate plant would be 15 to 20 g per liter, however, the exact amount would depend on the amount of impurity being leached from the ore. The number of leach stages 219 will vary, depending on the amount of copper impurity present in the ore. Two leach stages 219 should be considered to be a minimum requirement, but three or four stages 219 would be found to be suitable in most applications.

The application of the invention comprising the intermediate plant to a carbon-in-pulp process is essentially the same, except that a separate adsorption column is used, as the adsorption takes place separately from the leach.

With certain forms of CIP or CIL recovery plants for gold incorporating the base metal recovery method and plant of this invention, the carbon collected from the bottom of the elution column 11 can be returned to the adsorption stage 17, where further adsorption can take place.

At a certain stage of the process, a point may be reached where, in the presence of competing copper, the carbon can not support adsorption beyond a certain proportion of gold cyanide complex. At this stage, as much of the carbon as is practically possible is passed through the intermediate plant to remove the copper cyanide complex salt in the elution column 11, and then instead of being recirculated to the leach and adsorption circuit, is then treated to remove the gold cyanide complex. Two methods of treating the gold cyanide complex on the loaded carbon in conjunction with the intermediate plant hereinbefore described, will now be discussed with reference to the description of two further embodiments and FIGS. 3 and 4 of the accompanying drawings.

Figure 3:
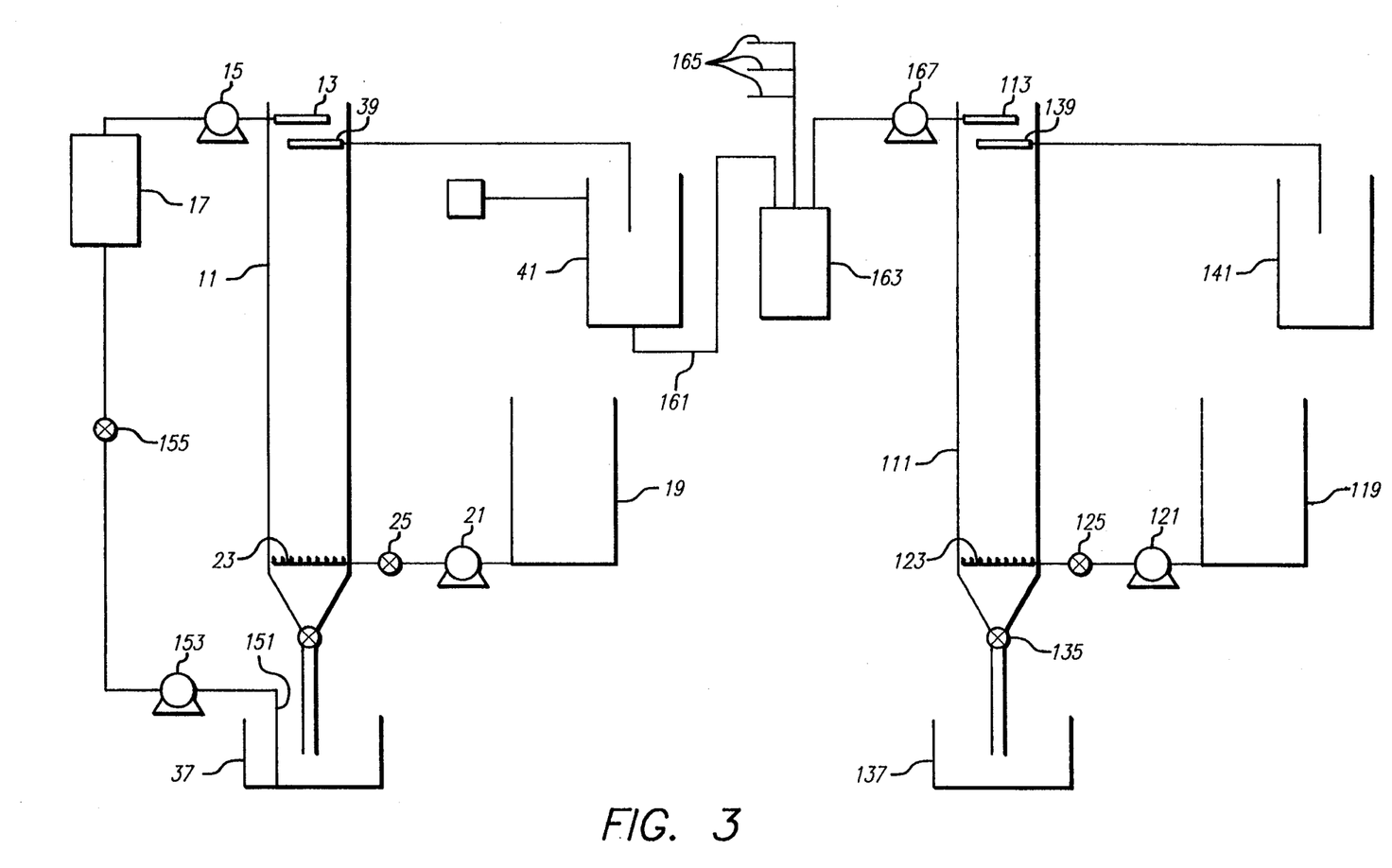
FIG. 3 is a schematic block diagram of a CIP/CIL plant for noble metal recovery incorporating an intermediate plant for removing base metal cyanide complexes from activated carbon in the ore leach/absorption stage according to the second embodiment.
Figure 4:
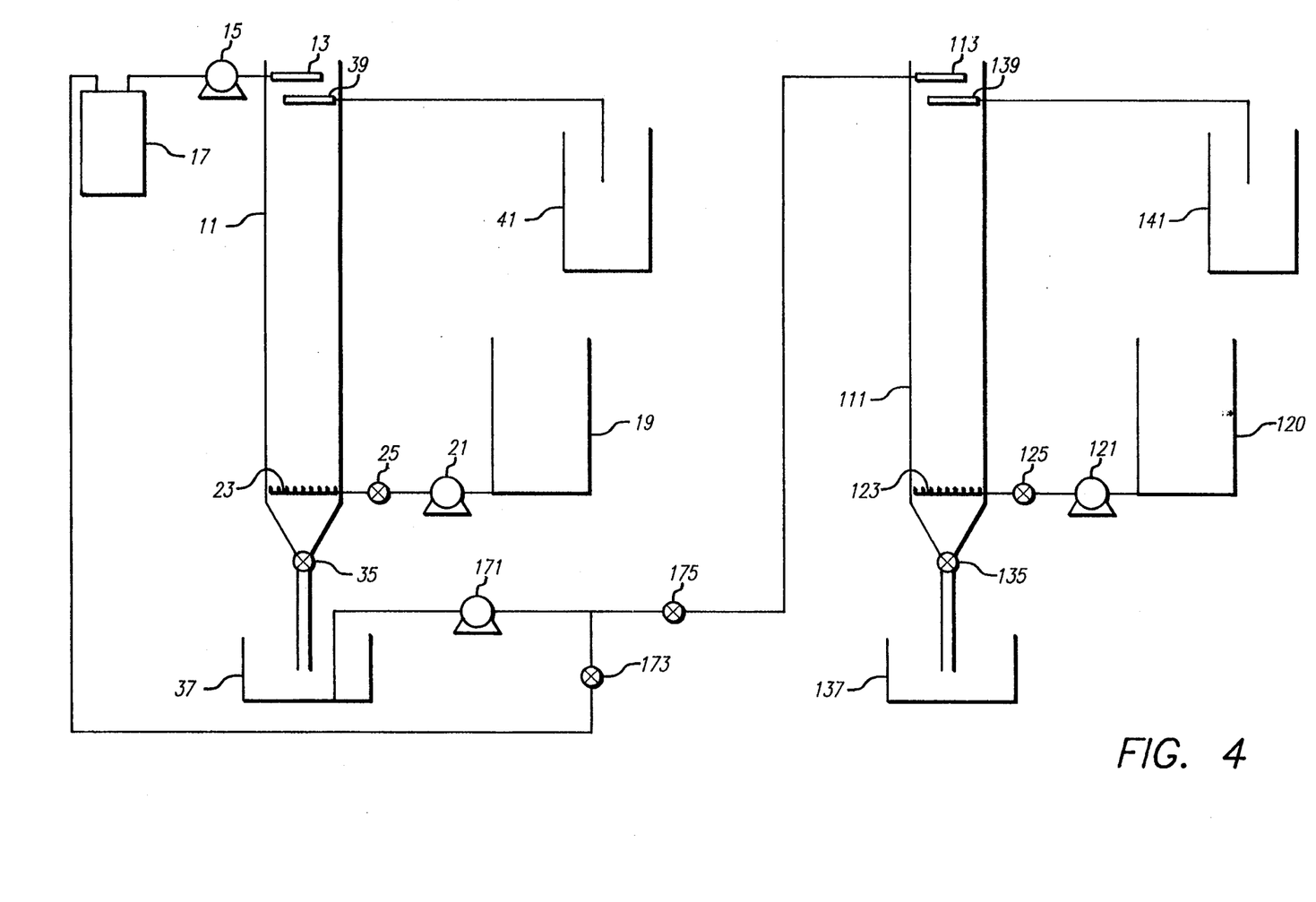
FIG. 4 is a schematic block diagram of a CIP/CIL plant for noble metal recovery incorporating an intermediate plant for removing base metal cyanide complexes from activated carbon in the ore leach/adsorption stage according to the third embodiment.

The gold elution plant consists of an elution column 111 into which is fed carbon loaded with noble metal through a feed inlet 113, located at the top of the elution column 111. Made up sodium cyanide solution 119 is transported by a pump 121 to a diffusing manifold 123 located in the bottom of the elution column 111. A one-way valve 125 is located between the tank containing the made-up sodium cyanide solution 119 and the diffusing manifold 123, to prevent back-flow from the elution column 111 when the pump 121 is not running.

A valve 135 is provided to empty the barren carbon from the bottom of the elution column 111.

An eluate outlet 139 is provided near the top of the elution column 111 for transporting the pregnant liquor containing noble metal cyanide complex salt to a holding tank 141, pending recovery of the gold metal.

Referring to FIG. 3, the receptacle 37 accommodates a feeder 151 connected to a pump 153 for transporting stripped or partially stripped carbon selectively to the leach adsorption circuit stage 17 via a valve 155.

The plant 41 has an outlet 161 for transportation of noble metal cyanide complex salts to a further carbon adsorption stage 163. Further inlets 165 are provided to the further carbon adsorption stage 163 to allow the connection of similar outlets 161 from other intermediate plants and associated base metal removal plants which operate in parallel with further adsorption stages in pulp leach and carbon adsorption circuits in the ore recovery plant. A pump 167 is provided for pumping the carbon which is loaded with gold cyanide complex salts from the further carbon adsorption stage 163, to the feed inlet 113.

In use, the intermediate plant operates as hereinbefore described. The stripped or partially stripped carbon is returned from the receptacle 37 to the adsorption stage 17 via one-way valve 155 until a point is reached where no further gold loading is desired onto the carbon contained with the adsorption stage 17. When that point is reached, the elution column 11 and the made-up sodium cyanide solution is made ready for elution of gold by bringing the contents up to a higher temperature, around 100° C. The carbon is then introduced into the top of the elution column 11 via the slurry separation screen 13, and the gold is then stripped from the carbon within the elution column 11, and passed through the plant 41. Providing that the plant 41 uses a selective process, the cyanide gold complex will pass through to the outlet 161 without being affected, however if another method is used to remove base metals which has effect on noble metals, steps must be taken to divert the gold cyanide complex around the plant 41. The gold cyanide complex eluate from the elution column 11 is more dilute than the eluate of a fully gold loaded carbon, in the instance where a gold cyanide complex did not have to compete with a copper cyanide complex, and it is for this reason that the gold cyanide complex is concentrated by passing it into a further carbon adsorption stage. In the absence of competing base metal cyanide complexes, the gold cyanide complex will load onto the carbon to saturation, whereupon it will be eluted in the elution column 111 in the standard manner and collected in the holding tank 141, for electrowinning.

The third embodiment is substantially similar to the second embodiment except that the gold cyanide complex concentration stage is not included. Referring to FIG. 4, a pump 171 is provided for selectively pumping stripped or partially stripped carbon from the receptacle 37 back to the adsorption stage 17. When the predetermined point is reached, the valve 173 is shut off and the valve 175 is opened, and the partially stripped carbon is pumped to the feed inlet 113 in the top of the elution column 111, where the gold cyanide complex is eluted from the partially loaded carbon. As the first elution column 11 will have acted as a presoak, the elution column 111 uses water heated to close to 100° C. as an eluant, supplied from the feed-tank 120 instead of made up sodium cyanide solution 119.

It should be appreciated that the scope of the present invention is not limited to the specific embodiments described herein. In particular, having described and ascertained the invention, it should be quite clear that with very minor modification, the plant can be used to recover and concentrate dissolved copper from tailings water in any type of mine where copper is present, and is regarded as an impurity. One such example of this alternative use would be in a CIP/CIL gold recovery process where divalent or trivalent cyano-copper anion complexes are presently discarded in the tailings dam at such plants, presenting a difficulty when the water is sought for reuse. By using the plant and method of this invention, both pure copper values and cyanide can be recovered. The invention will also have application in removing mercury contamination from copper ores, by refining the copper ore and separating it from the mercury values, as mercury has similar properties to noble metals in a CIP/CIL process.

I claim:

1. A method of preferentially recovering base metal values from material containing said base metal values and noble metal values, comprising the steps of:

forming an aqueous solution of a cyano-base metal complex and a cyano-noble metal complex including a cyano-base metal complex anion having the stoichiometry $M(CN)_x{}^{y-}$, where M is a base metal cation, x is 2 or 3 or 4, and y is 1 or 2 or 3; by adjusting the amount of available cyanide anion to said base metal cation to favour formation of said cyano-base metal complex anion;

adsorbing said cyano-base metal complex onto activated carbon by contacting said aqueous solution with said activated carbon until a significant amount of said cyano-base metal complex has been adsorbed; and stripping said cyano-base metal complex from said activated carbon as cyano-base metal complex for subsequent recovery of base metal values and recovery for reuse of said activated carbon.

2. A method of recovering base metal values as claimed in claim 1 wherein in the step of forming said solution, said available cyanide is adjusted by adding aqueous cyanide in quantity sufficient to satisfy but not substantially exceed the ratio of x moles of cyanide anions to one mole of available base metal cation.

3. A method of recovering base metal values as claimed in claim 1 wherein the step of forming said cyano-base metal complex is carried out in a chemical environment where the pH is less than or equal to 9.

4. A method of recovering base metal values as claimed in claim 3 wherein the pH is maintained at approximately 8.

5. A method of recovering base metal values as claimed in claim 1 wherein the steps of forming said cyano-base metal complex and adsorbing said cyano-base metal complex are performed concurrently.

6. A method of recovering base metal values as claimed in claim 1 wherein the step of stripping said cyano-base metal complex is performed by contacting said activated carbon supporting said cyano-base metal complex, with a further solution of aqueous cyanide at a concentration sufficient to increase the cyanide mole ratio of said cyano-base metal complex.

7. A method of recovering base metal values as claimed in claim 6 wherein in the step of stripping said cyano-base metal complex, said further solution of aqueous cyanide is added in quantity sufficient to satisfy or exceed the ratio of one mole of cyanide anion to one mole of complex anion available on said activated carbon supporting said cyano-base metal complex.

8. A method of recovering base metal values and noble metal values from an ore containing said two values comprising the steps of:

operating the method as claimed in claim 1 at parameters favourable to leach said base metal values from said ore, and substantially unfavourable for leaching said noble metal values from said ore; and recovering said noble metals values from said ore subsequent to having removed said base metal values therefrom.

9. A method as claimed in claim 8 wherein the step of stripping said base metal complex is performed at a temperature of less than 45° C.

10. A method as claimed in claim 9 wherein the step of stripping said base metal complex is performed at a temperature of less than 40° C.

11. In a process for extracting noble metal values from ores rich in the same, a further process for recovering base metal impurities contained in said ore by operating the method as claimed in claim 1 to treat said ore, before extracting said noble metal values from said ore.

12. A method as claimed in claim 11 wherein the step of stripping said base metal complex is performed at a temperature of less than 45° C.

13. A method as claimed in claim 12 wherein the step of stripping said base metal complex is performed at a temperature lying of less than 40° C.

14. A method as claimed in claim 1 further including a step of recovering cyanide solution from said cyano-base metal complex for reuse.

15. A method of preferentially recovering base metal values from material containing said base metal values and noble metal values comprising the steps of:

forming an aqueous solution of a cyano-base metal complex having an affinity for adsorption sites on activated carbon, by adjusting the amount of available cyanide anion to said base metal cation in order to form said complex;

adsorbing said cyano-base metal complex onto activated carbon by contacting said aqueous solution with said activated carbon until a significant amount of said cyano-base metal complex has been adsorbed; and, stripping said cyano-base metal complex from said activated carbon for subsequent recovery, by altering the chemical environment in order to form a cyanide complex reaction product from said cyano-base metal complex and said chemical environment, where said reaction product is characterized in having little affinity for adsorption sites on activated carbon; and returning for re-use said activated carbon.

16. A method as claimed in claim 15 wherein said cyano-base metal complex comprises a complex anion having the stoichiometry $M(CN)_x{}^{y-}$, where M is a base metal cation, x is 2 or 3 or 4, and y is 1 or 2 or 3; and said cyano-base metal complex is formed by adjusting the amount of available cyanide anion to said base metal cation.

17. A method as claimed in claim 15 further including a step of recovering substantially all of said cyanide anion from said cyanide complex reaction product for reuse.

18. A method as claimed in claim 16 further including a step of recovering substantially all of said cyanide anion from said cyanide complex reaction product for reuse.

* * * * *